US006585844B1

(12) United States Patent
Lochner

(10) Patent No.: US 6,585,844 B1
(45) Date of Patent: Jul. 1, 2003

(54) METHOD AND DEVICE FOR PRODUCING LAMINATED LABELS, AND LAMINATED LABELS OBTAINED USING THE SAME

(75) Inventor: Mathias Lochner, Ismaning (DE)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/601,829

(22) PCT Filed: Feb. 4, 1999

(86) PCT No.: PCT/EP99/00735

§ 371 (c)(1),
(2), (4) Date: Oct. 2, 2000

(87) PCT Pub. No.: WO99/39903

PCT Pub. Date: Aug. 12, 1999

(30) Foreign Application Priority Data

Feb. 6, 1998 (DE) ........................................ 198 04 807

(51) Int. Cl.[7] ........................ B32B 31/00; B32B 31/18; B31D 1/02

(52) U.S. Cl. ....................... 156/250; 156/269; 156/289; 156/297; 156/510; 156/540; 428/40.1; 428/42.3

(58) Field of Search ................................ 156/540, 542, 156/543, 510, 522, 250, 267, 269, 277, 289, 297, 248; 428/40.1, 42.3, 42.2

(56) References Cited

U.S. PATENT DOCUMENTS

| | | | | | |
|---|---|---|---|---|---|
| 2,725,101 | A | | 11/1955 | Von Hofe | 164/48 |
| 3,295,654 | A | | 1/1967 | Clinton et al. | 197/133 |
| 3,522,136 | A | | 7/1970 | Williams et al. | 156/584 |
| 4,642,256 | A | * | 2/1987 | Sato | 428/42 |
| 5,035,935 | A | | 7/1991 | Thomas et al. | 428/43 |
| 5,262,214 | A | * | 11/1993 | Instance | 428/42.1 |
| 5,639,332 | A | * | 6/1997 | Instance | 156/248 |
| 5,679,427 | A | * | 10/1997 | Instance | 428/40.1 |
| 5,722,653 | A | | 3/1998 | Seidl et al. | 271/117 |
| 5,738,382 | A | * | 4/1998 | Grosskopf et al. | 283/81 |
| 5,775,872 | A | | 7/1998 | Seidl et al. | 414/789.5 |

FOREIGN PATENT DOCUMENTS

| | | |
|---|---|---|
| DE | 20 19 401 | 11/1971 |
| DE | 2 019 401 | 11/1971 |
| DE | 2 212 995 | 9/1973 |
| DE | 22 12 995 | 9/1973 |
| DE | 29 54 730 | 2/1981 |
| DE | 43 38 214 | 5/1995 |
| EP | 0 212 919 | 3/1987 |
| GB | 2 274 268 | 7/1994 |

* cited by examiner

*Primary Examiner*—Richard Crispino
*Assistant Examiner*—Sue A. Purvis
(74) *Attorney, Agent, or Firm*—Christie, Parker & Hale, LLP

(57) ABSTRACT

The invention relates to a method and device for producing laminated labels in which a supporting material web (TB) with labels (E) arranged thereon is advanced to a laminated film deposit station (30). A laminated film web (LB) is deposited on the supporting material web (TB) in said deposit station. Afterwards, the resulting laminated label web (EB) is advanced to a separating station (40). The invention additionally provides that before the supporting material web (TB) is advanced to the laminated film deposit station (30), the labels (E) are individually deposited on the supporting material web (TB) while forming spaces (Z) situated in a longitudinal direction of the supporting material web (TB). Afterwards, individual segments of the laminated label web (EB) are separated in the separating station (40) by means of at least one cut which runs essentially perpendicular to the longitudinal extension of the laminated label web (EB) and which is placed in the spaces (Z). The invention also relates to a device for producing the laminated labels and to the laminated labels produced using the same.

13 Claims, 3 Drawing Sheets

METHOD AND DEVICE FOR PRODUCING LAMINATED LABELS, AND LAMINATED LABELS OBTAINED USING THE SAME

FIELD OF THE INVENTION

The present invention concerns a process and an apparatus for producing laminate labels.

BACKGROUND

In practice laminate labels have been produced by a procedure in which a supporting material web with an endless label web arranged thereon is fed to a laminate film deposit or application station in which the transparent laminate film or foil web is applied to the supporting material web in such a way that the label web is received sandwich-like between the supporting material web and the laminate film web. As the side of the laminate film web which faces the supporting material web is provided with an adhesive coating, the laminate film then sticks to the supporting material. Thereupon the laminate label web consisting of the laminate film web, the label web and the supporting material web is fed to a separating station in the form of a stamping station in which individual labels are cut out of the laminate label web by means of a rotating stamping cylinder. For that purpose, at its peripheral wall, the stamping cylinder has at least one blade contour corresponding to the shape or contour of the actual label.

That operating procedure in the state of the art has proven to be disadvantageous insofar as different stamping cylinders have to be used for different label sizes and for different label shapes or contours. As stamping cylinders of that kind are comparatively costly to produce, the costs involved in an apparatus for producing laminate labels are increased. Furthermore, changing from one kind of label to a kind of label that differs therefrom in regard to size and/or shape involves a considerable assembly expenditure.

In addition the known laminate labels produced in that way suffer from the disadvantage that dirt and/or moisture can penetrate between the actual label and the laminate film or sheet, by way of the edge of the labels applied to the article to be labeled, as the laminate film terminates flush with the label material at the edge. If laminate labels of that kind are used, for example, in machines and the like in a dirty and/or humid atmosphere, then they can become illegible or detached from the machine.

GB-A-2 274 268 discloses a process and an apparatus of the kind set forth in the opening part of this specification. In the known process, after the laminate film web has been applied to the supporting material web which is already provided with the labels, the laminate label web produced in that way is fed to a stamping station in which individual labels are stamped out of the laminate label web. In that case however the supporting material web is not stamped therethrough so that the stamped-out laminate labels remain on the supporting material web which moves on continuously. After the stamping-out station, the rest of the laminate film web is pulled off the laminate labels and the supporting material web and wound on to a roll which is provided separately for that purpose.

In addition EP-A-0 212 219 discloses a process for producing labels and the labels themselves. That known production process provides for applying to the supporting material web is provided with an adhesive layer on one side, individual folded sheets of paper which adhere to the supporting material web as a result of the adhesive layer provided thereon. Then, applied to the supporting material web and the individual labels disposed thereon is a laminate film web, the width of which corresponds to the width of the supporting material web.

SUMMARY OF THE INVENTION

An object of the present invention is to provide a process and an apparatus for producing laminate labels with which laminate labels that differ in terms of shape and size can be produced in a simple fashion.

In regard to the process the foregoing object is attained by the features of claim 1. In contrast to the state of the art in which a laminate label is stamped in a single step out of the laminate label web consisting of the laminate film web, the label web and the supporting material web, the process according to the invention provides that in a first step the labels are arranged individually on the supporting material web, while maintaining intermediate spaces between the labels in the longitudinal direction of the supporting material web. Thereupon, in a second step, after the preferably transparent laminate film, which also preferably has an adhesive coating on its side facing towards the supporting material web, has been applied to the supporting material web, an individual segment of the laminate label web formed in that way is separated off by means of a cut which extends substantially transversely with respect to the direction of advance movement of the label web. Then, the actual label is obtained from that segment of the laminate label web by pulling the supporting material off the label and the laminate film.

That operating procedure has the advantage that there is no need to have different stamping or cutting tools for different labels. On the contrary, the supporting material web, which is preferably wound up to form a roll, can be 'equipped' with labels of the appropriate shape and size, in the first step. That first step can in principle be implemented in the apparatus for producing the laminate label itself. It is however also possible for that first step to be implemented in a label-equipping apparatus which is specifically provided for that purpose and which is arranged separately from the apparatus for producing the laminate label, which apparatus includes the laminate film deposit station and the separating station. As the supporting material web is frequently not produced by the user of the production apparatus for the laminate labels, the user of the apparatus only has to provide rolls with labels which differ in terms of size and shape, and keep such rolls on hand in order to be able to produce different labels. Furthermore, upon a change from one type of label to another type of label which differs in terms of shape and size, there is no need for an assembly operation for replacing any tools, as is the case in the state of the art in regard to the stamping cylinder, but it is only necessary to fit the roll of the backing material web with the other labels into the production apparatus. In addition, the present method reduces the stoppage times of the production apparatus, as complicated dismantling and assembly procedures for the stamping cylinder are no longer required, but, as already indicated above, it is only necessary to replace the supporting material web or the roll thereof.

In principle it is possible for the cut for separating the individual segments of the laminate label web to be implemented precisely along the two edges of the label, which extend substantially transversely with respect to the longitudinal extent of the supporting material web. In that case, two cuts are necessary to separate an individual segment of the laminate label web, which cuts have to be formed in the respective intermediate space. If, in contrast, only a single cut is produced, preferably in approximately the center between two successive labels in the intermediate space, then the number of cuts required to produce a segment or a laminate label is reduced. Moreover, the laminate film projects beyond the label at least at those two edges. That projecting portion can be used not only to attach the laminate label better to the article to be labeled therewith, but also, as the film adheres sealingly to the article, to prevent the ingress of dirt and/or moisture between the laminate film and the label.

In order to increase the adhesion of the label to the article to be labeled, it can further be provided that, on the side facing towards the-backing material, the label is provided with an adhesive or glue coating which is of such a nature that the label is fixed on the backing material, but can be readily detached from the backing material. So that the laminate film and the label which is preferably provided with an adhesive coating can be readily detached from the backing material when releasing a label from a label segment, it can further be provided that the backing material is provided with an anti-adhesion coating, preferably a silicone coating. In that arrangement that anti-adhesion coating should be of such a nature that the laminate film and the label adhere to a certain degree to the backing material, but upon detachment no constituents of the backing material remain adhering to the laminate film and/or the label.

If the labels are arranged on the supporting material web asymmetrically with respect to the longitudinal axis thereof, that affords a gripping edge which makes it easier to detach an individual laminate label from a segment of the laminate label web, which is produced by the separating station, and to apply the laminate label to the article to be labeled therewith. In particular the laminate label is not damaged thereby and/or the adhesive coating of the laminate foil or the label is not rendered useless by contact with, for example, the hand.

If in that case a laminate film web is applied to the supporting material web provided with the individual labels, the width of which (that is to say the direction perpendicular to the longitudinal extent of the supporting material web or the laminate film web in the plane of the web) is less than the width of the supporting material web, that makes it possible to achieve a saving in material in regard to the laminate film as, for example, an existing gripping edge on the supporting material web does not need to be covered over by the laminate film.

In order to facilitate detachment of a laminate label from the supporting material web, the supporting material web can be provided with a stamped-out portion, in the region of the label. In order to be able to apply a laminate label to an article to be labeled therewith, the stamped-out portion is first pulled off the laminate label web and then the remaining supporting material.

In order to facilitate detachment of the stamped-out portion, it can further be provided that the label is provided with a perforation which extends approximately in the longitudinal direction of the supporting material web and which is arranged in the region of an edge.

It has proven to be advantageous for controlling the separating station for the labels to be arranged on the supporting material web with intermediate spaces of equal size therebetween.

The laminate film web can simply be laid on the supporting material web. In order to achieve particularly good adhesion of the laminate film web to the supporting material web, it has further proven to be advantageous for the laminate film web to be rolled on to the supporting material web in the laminate foil deposit or application station.

Particularly flexible use of the process according to the invention can be achieved if the labels which are arranged on the supporting material web are printed upon, prior to being fed to the laminate film deposit or application station, preferably in the apparatus for producing the laminate labels.

In regard to the apparatus, the foregoing object is attained by the features of claim 9. By virtue of the provision of a cutting device which produces a severing cut extending substantially transversely with respect to the direction of advance movement of the label web, the apparatus according to the invention does not require a stamping cylinder which is to be adapted to the respective label. This means therefore that the production apparatus according to the invention does not involve any dismantling and assembly procedures and cost for such cylinders.

The cutting device can be formed by the most widely varying arrangements. Preferably, the cutting device has at least one blade which is movable reversibly perpendicularly to the surface extent of the label web and which can be arranged at the top side or the underside of the label web. That blade co-operates with a counterpart blade which is optionally also movable and which is then arranged either at the underside or the top side, respectively, of the label web.

In order to be able to individually print the labels according to the respective wishes of the individual user of the production apparatus, it can further be provided that a printing station having one or more printing heads is disposed upstream of the laminate film deposit station in the feed direction of the supporting material web.

In order to be able to apply the laminate film web to the supporting material web in a bubble-free manner and in such a way that it is held firmly thereto, it can further be provided that the laminate film deposit station has one or more pressure rollers which extend substantially over the width of the laminate film web.

As has already been pointed out, the laminate film edge which projects beyond the supporting material of the finished label prevents the ingress of dirt and/or moisture between the laminate film and the label. At the same time, the projecting edge portion of the laminate film can be used to apply the label to the article to be labeled therewith. Moreover, that affords the possibility that no additional adhesive or glue layer has to be applied to the side of the label which faces away from the laminate film. If an adhesive or glue layer of that kind is provided at the side of the label which faces away from the laminate film then the projecting edge portion of the laminate film serves at the same time as additional protection against unauthorized detachment of the label from the article to be labeled therewith. As the label itself adheres to the articles, parts of the layer of the label which carry the printing applied thereto are also detached when the laminate film is pulled off the adhering label. In contrast to known laminate labels in which the laminate film terminates at the edge of the label flush therewith, the present label can be removed by being pulled off at the adhesive side without damage.

DESCRIPTION OF THE DRAWINGS

An embodiment of the present invention is described in greater detail hereinafter with reference to the accompanying drawings in which.

DETAILED DESCRIPTION

Figure 1:
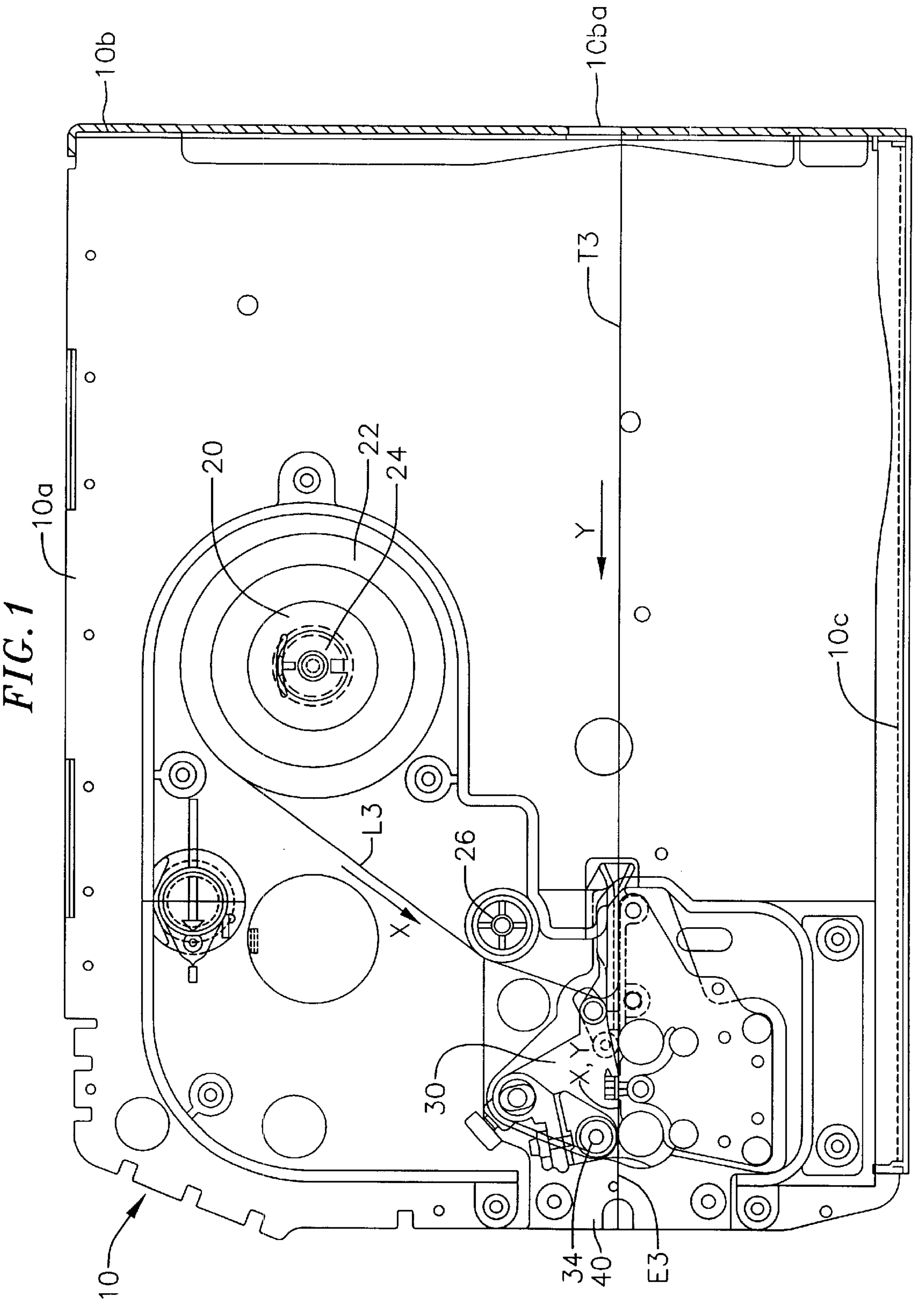
FIG. 1 is a diagrammatic side view of an apparatus for producing laminate labels.
Figure 3:
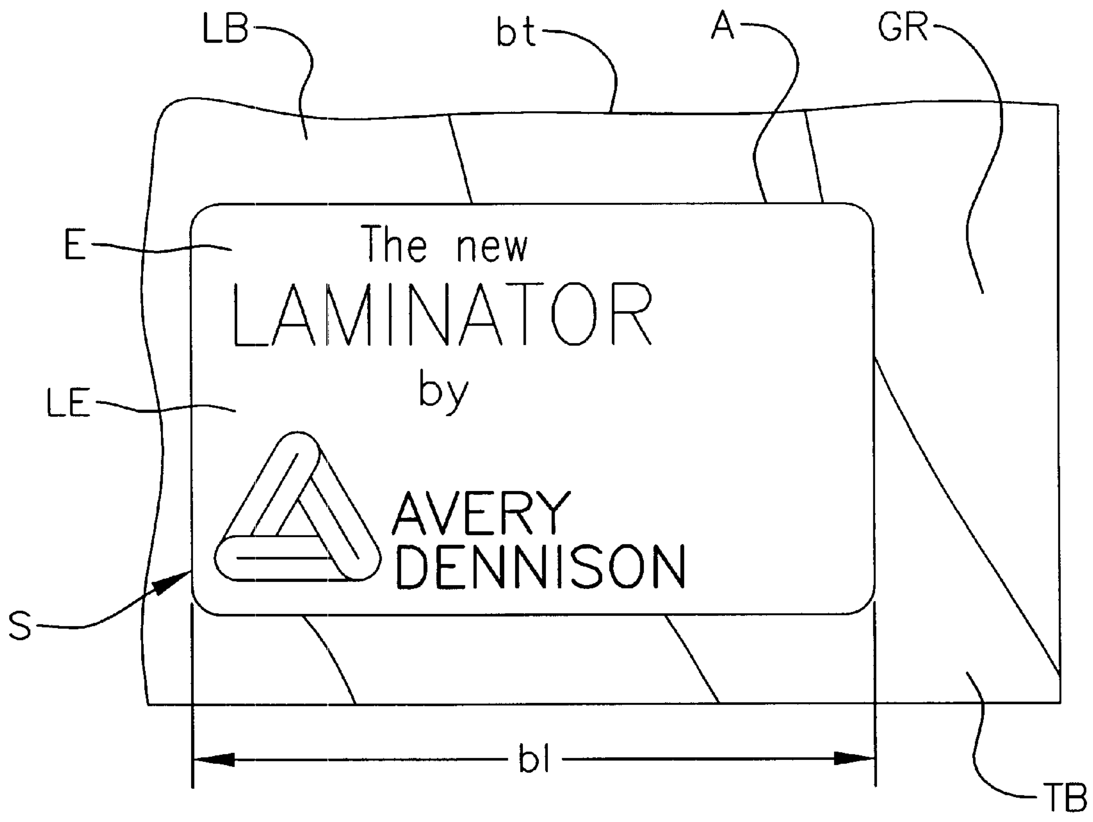
FIG. 3 is a plan view of a segment of a laminate label according to the invention.

FIG. 1 diagrammatically shows an apparatus 10 for producing laminate labels LE (see FIG. 3). The housing which encloses the individual structural units of the apparatus 10, which are described in greater detail hereinafter, is partially removed in FIG. 1. Only the rear wall 10*a* which extends substantially vertically with respect to FIG. 1, the right-hand side wall 10*b* which also extends vertically with respect to FIG. 1, and the bottom 10*c* which extends horizontally also again with reference to FIG. 1 are illustrated therein.

The production apparatus 10 includes a supply station 20 for receiving a laminate film web LB which is rolled up to form a supply roll 22, a laminate film deposit or application station 30 and a separating station 40.

The supply station 20 for the laminate film roll 22 is substantially formed by a shaft 24 which is mounted rotatably in the vertical wall 10*a* and on to which the supply roll 22 can be pushed and locked axially thereon by a locking device (not shown). The laminate film or sheet web LB is pulled off the supply roll 22 in the direction of the arrow X and passed over a direction-changing roller 26 to the laminate film deposit station 30.

In the laminate film deposit station 30, the laminate film web LB is applied to the supporting material web TB which in relation to FIG. 1 is fed substantially horizontally in the direction of the arrow Y in FIG. 1 (that is to say, with respect to FIG. 1, from right to left). As can be seen from FIG. 1 the supporting material web TB is passed through an opening 10*ba* in the right-hand side wall 10*b*, into the interior of the production apparatus 10. It will be appreciated that there is also the possibility of providing a corresponding supply roll for the supporting material web TB in the interior of the production apparatus 10.

Figure 2:
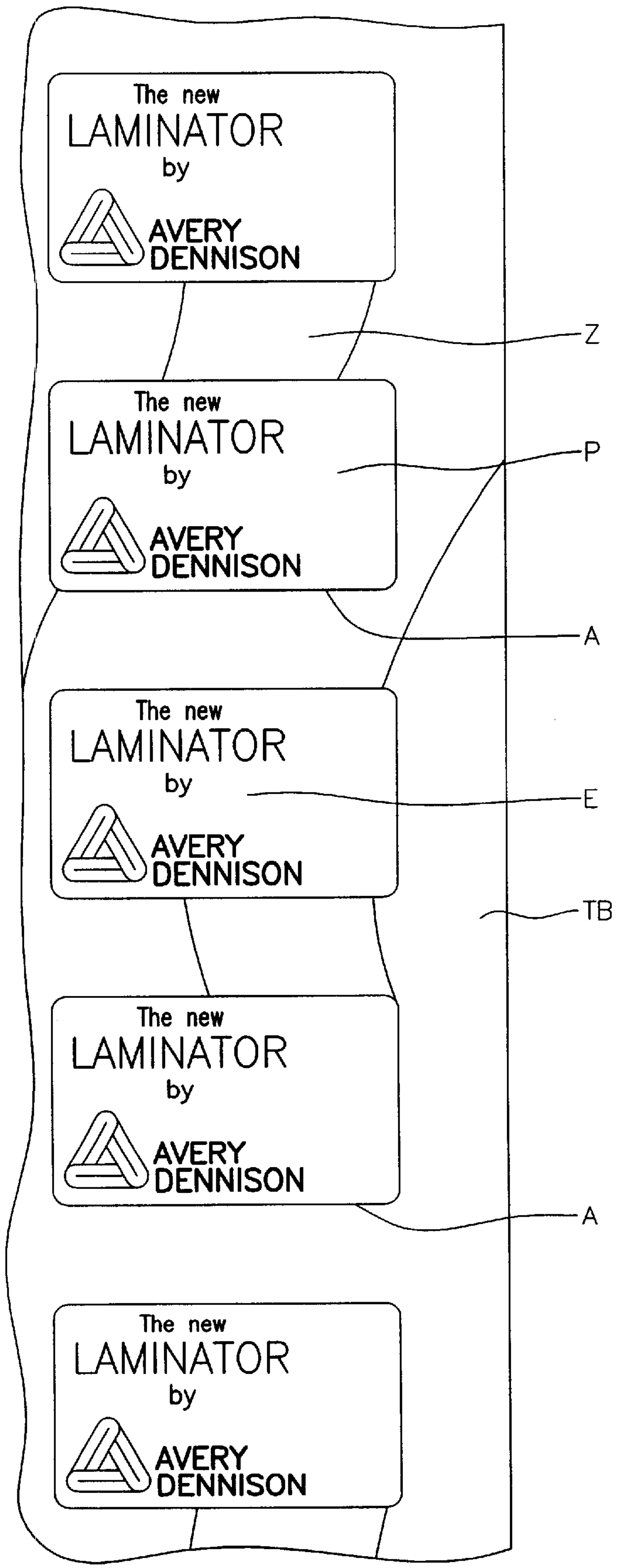
FIG. 2 is a plan view of a supporting material web used in the apparatus shown in FIG. 1, with individual labels arranged thereon.

As can be seen from FIG. 2, the supporting material web TB has a plurality of individual labels E which are arranged in succession in the longitudinal direction of the supporting material web TB, maintaining intermediate spaces Z of approximately equal size therebetween. The labels E are arranged on the supporting material web TB asymmetrically relative to the longitudinal axis thereof, that is to say they are oriented closer to the one longitudinal edge of the supporting material web TB than the other longitudinal edge.

On their side which faces towards the supporting material web TB, the labels E have an adhesive coating, whereas at its side which faces towards the labels E, the supporting material web TB is provided with a non-stick or anti-adhesion coating which prevents the labels E from adhering to the supporting material web TB but permits the labels E to cling to the supporting material web TB so that the labels E are fixed in position on the supporting material web TB.

As can further be seen from FIGS. 2 and 3, in the region of each label E the supporting material web TB has a stamped-out portion A which is smaller than the label E and which is so arranged in relation to the label E that it projects beyond the label E at three edge sides thereof. That stamped-out portion A makes it easier to pull off the laminate label LE (see FIG. 3) as the material of the stamped-out portion A is firstly pulled off the laminate label LE and then the rest of the supporting material of the supporting material web TB can be readily removed from the laminate label LE.

Finally it can also be seen from FIG. 2 that, at the longitudinal edge which is in the region of the stamped-out portion A, each label E has a perforation which extends substantially parallel to the longitudinal edge.

In the laminate film deposit station 30, the preferably transparent laminate film web LB which is provided with an adhesive or glue coating at its side which faces towards the supporting material web TB is firstly applied to or deposited on the supporting material web TB by means of a guide roller 32 and then by means of a laminating roller 34. As can be seen from FIG. 3, the laminate film web LB is of a smaller width than the supporting material web TB. The width of the laminate film web LB is denoted by the double-headed arrow bl and the width of the supporting material web is denoted by the double-headed arrow bt. At the same time the laminate film web LB is deposited on the supporting material web TB in flush relationship with the supporting material web edge, towards which the label E is also moved closer. That affords a gripping edge GR which makes it easier to apply an individual laminate label LE to an article to be labeled.

As can also be seen from FIG. 3 the width bl of the laminate films LB is so selected that, when terminating flush at the one longitudinal edge of the supporting material web TB (that is to say with its left-hand edge in relation to FIG. 3), it terminates flush with the edge of the stamped-out portion A which lies outside the label E (that is to say the right-hand edge of the stamped-out portion A, with respect to FIG. 3).

After the laminate film web LB has been applied by a laminating procedure by means of the laminating roller 34 the result is the label web EB which is then fed to the separating station 40. In the separating station 40 individual segments S of the label web EB (see FIG. 3) are separated from the label web EB by means of a cut which extends substantially transversely with respect to the longitudinal extent of the label web EB and which is formed in the intermediate spaces Z. That cut is produced by a blade (not shown) which extends substantially transversely with respect to the longitudinal extent of the label web EB and which is movable reversibly in a vertical direction, with respect to FIG. 1. That blade can be in the form of a top blade or a bottom blade. It co-operates with a counterpart blade which is correspondingly arranged at the top side or the underside, respectively, of the label web EB and which itself is in turn movable but which can also be arranged stationarily. The separating station 40 separates off the individual segments which, in relation to FIG. 1, to the left of the separating station 40, drop into a suitable catch device (not shown).

The procedure involved in production of a laminate label LE according to the invention is as follows:

Firstly, the individual labels E of the desired shape and size, which can already bear the perforation P, are deposited on or applied to the supporting material web TB in an apparatus which is possibly arranged separately from the production apparatus 10 according to the invention, in such a way that the intermediate spaces Z exist in the longitudinal direction of the supporting material web TB. Then, or before that, the supporting material web TB can be provided with the stamped-out portions A.

The supporting material web TB prepared in that way is thereupon fed to the laminate film deposit station 30 in which the laminate film web LB is uniformly applied to the supporting material web TB. The supporting material web TB with the laminate film web LB as the label web EB is then fed to the separating device 40 where individual segments S of the label web EB are separated therefrom. That is effected by a cut which extends substantially transversely with respect to the longitudinal extent of the supporting material web TB and which is formed in the intermediate spaces Z between the individual labels E. Then, from the separated-off label segments S, the individual laminate labels LE can be stuck to the article to be labeled by pulling off the supporting material in the region of the stamped-out portion A and thereupon by pulling off the rest of the supporting material. In that procedure the segment can be held at the gripping edge GR so that it is not soiled or contaminated and the adhesive coating on the label E and the laminate film L is not rendered useless. As the cut is implemented in the intermediate space Z and the supporting material is completely detached from the label E and the laminate film, the laminate film projects beyond the label E, as is shown in FIG. 3. As a result, the laminate label E can be applied to an article to be labeled therewith, in a particularly reliable fashion, without the danger of dirt and/or moisture penetrating between the laminate film and the label E.

What is claimed is:

1. A process for producing laminate labels comprising:

individually applying labels to a supporting material web while maintaining intermediate spaces between the labels, feeding the supporting material web with labels arranged thereon to a laminate film deposit station in which a laminate film web is deposited on the supporting material web to form a laminate label web, feeding the laminate label web to a separating station, wherein the side of each label which faces away from the laminate film web is provided with an adhesion coating and the side of supporting material web which faces toward the labels is provided with an anti-adhesion coating, and further wherein the laminate film web has a width smaller than the width of the supporting material web, and separating off individual segments of the laminate label web in a separating station by a cut which extends substantially transversely with respect to the longitudinal extent of the laminate label web and which is formed in the intermediate spaces between two successive labels.

2. A process as set forth in claim 1 wherein the cut is formed approximately in the center of the intermediate space between two successive labels.

3. A process as set forth in claim 1 wherein the labels are arranged on the supporting material web asymmetrically with respect to the longitudinal axis thereof.

4. A process as set forth in claim 1 wherein the supporting material web is provided with a stamped-out portion in the region of each label.

5. A process as set forth in claim 1 wherein each label is provided with a perforation which extends approximately in the longitudinal direction of the supporting material web and which is arranged in the region of an edge of the label.

6. A process as set forth in claim 1 wherein the labels are arranged on the supporting material web while maintaining intermediate spaces of equal size.

7. A process as set forth in claim 1 wherein the laminate film web is rolled on to the supporting material web in the laminate film deposit station.

8. A process as set forth in claim 1 wherein the labels arranged on the supporting material web are printed upon before being fed to the laminate film deposit station.

9. A system for producing laminate labels comprising:

a laminate film web a laminate film deposit station in which the laminate film web can be applied to a supporting material web carrying labels while maintaining intermediate spaces between the labels, wherein the side of the labels facing away from the laminate film web is provided with an adhesion coating and the side of the supporting material web facing toward the labels is provided with an anti-adhesion coating;

a supply station comprising a supply roll for the laminate film web, wherein the laminate film web is of a smaller width than the width of the supporting material web;

a cutting device which produces a cut extending substantially transversely with respect to the feed direction of the label web in intermediate spaces between the individual labels on the label web to produce individual label segments each comprising a segment of the supporting material web, a label and a segment of laminate film web; and a separating station downstream of the laminate film deposit station in the feed direction of the label web for separating the individual label segments.

10. A system as set forth in claim 9 wherein the cutting device produces the cut approximately in the center of an intermediate space between two successive labels.

11. A system as set forth in claim 9 wherein the cutting device has at least one blade which is reversibly movable substantially perpendicularly to the surface extent of the label web.

12. A system as set forth in claim 9 wherein the laminate film deposit station has at least one laminating roller for applying the laminate film.

13. A system as set forth in claim 9 further comprising a printing unit for printing on the supporting material web upstream of the laminate film deposit station in the feed direction of the supporting material web.

* * * * *

UNITED STATES PATENT AND TRADEMARK OFFICE

CERTIFICATE OF CORRECTION

PATENT NO. : 6,585,844 B1
DATED : July 1, 2003
INVENTOR(S) : Lochner

It is certified that error appears in the above-identified patent and that said Letters Patent is hereby corrected as shown below:

Title page,
Item [56], References Cited, FOREIGN PATENT DOCUMENTS,
delete first occurrence of
"DE 2 019 401 11/1971"; and
"DE 2 212 995 9/1973".

Column 1,
Line 66, after "material web", insert -- which --.

Column 3,
Line 14, delete "the-backing", insert -- the backing --.

Column 8,
Line 15, after "film web", insert -- ; --.

Signed and Sealed this

Twenty-first Day of February, 2006

JON W. DUDAS
*Director of the United States Patent and Trademark Office*